R. HAGEN.
ROACH TRAPS.

No. 181,165.  Patented Aug. 15, 1876.

Witnesses.
Otto Stufeland.
Robt E. Miller.

Inventor.
Rudolf Hagen
Van Santvoord & Hauff
Attorneys

UNITED STATES PATENT OFFICE.

RUDOLF HAGEN, OF NEW YORK, N. Y.

IMPROVEMENT IN ROACH-TRAPS.

Specification forming part of Letters Patent No. 181,165, dated August 15, 1876; application filed June 22, 1876.

*To all whom it may concern:*

Be it known that I, RUDOLF HAGEN, of the city, county, and State of New York, have invented a new and useful Improvement in Traps for Cockroaches, which improvement is fully set forth in the following specification, reference being had to the accompanying drawing, in which—

Figure 1:
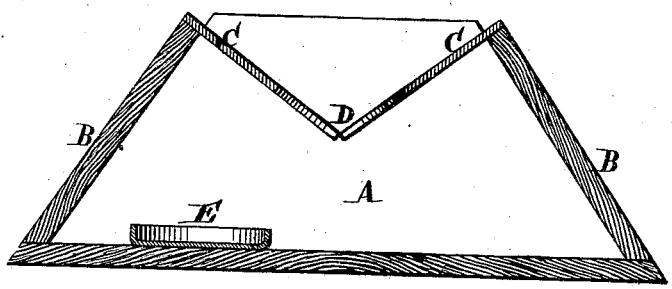
Figure 2:
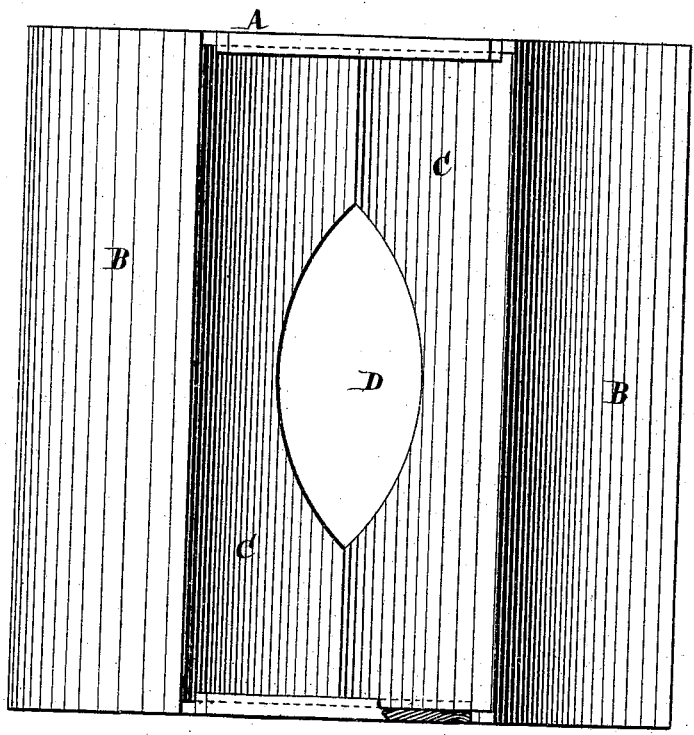

Figure 1 represents a vertical cross-section of my trap. Fig. 2 is a plan or top view of the same.

Similar letters indicate corresponding parts.

My invention relates to a trap for catching cockroaches and other wingless insects; and it consists in a case having opaque sides, and a top or roof composed of inwardly-inclined sides, which latter are made of glass or other vitreous material, and are provided with an opening for the admission of cockroaches; and when cockroaches or like insects are caught in this case, the inclined sides of its roof, which afford no hold for the feet of said insects, prevent their escape, as I will hereinafter point out.

In the drawing, the letter A designates a case or box, which is provided with opaque sides B B, and with an inwardly-inclined or funnel-shaped top or roof, C C. The sides B B are, by preference, inclined inwardly, as shown. The top or roof is made of glass or other vitreous material, while the remaining portion of the case is of wood or any other suitable material. In the said funnel-shaped top or roof, and at the point of intersection of its two sides, C C, is formed an opening, D, the same being made partly in one side and partly in the other side, as clearly shown. This opening D serves to admit the cockroaches to the interior of the case A.

When the cockroaches have found their way into the case A they will crawl up on the sides B B; but on reaching the panes C C, which afford no hold for them, they will drop back into the case.

In order to attract the cockroaches a dish, F, is placed into the case A, which is filled with beer or other suitable bait, the smell of which causes the insects to go in search thereof. By these means a large quantity of cockroaches can be caught in a short time.

In order to kill the cockroaches I remove the panes C C, and empty the insects into a vessel filled with boiled water.

What I claim as new, and desire to secure by Letters Patent, is—

In combination with the inclined sides B B of an insect-trap, the transparent panes C C, each having one side provided with a recess, so that when said recessed sides are brought together and inclined downwardly they form an aperture, D, as and for the purpose specified.

In testimony that I claim the foregoing I have hereunto set my hand and seal this 16th day of June, A. D. 1876.

RUDOLF HAGEN. [L. S.]

Witnesses:
W. HAUFF,
ROBT. E. MILLER.